US012681135B2

(12) United States Patent
Dent et al.

(10) Patent No.: US 12,681,135 B2
(45) Date of Patent: Jul. 14, 2026

(54) DUAL-POLARIZED MIMO RADAR

(71) Applicant: UHNDER, INC., Austin, TX (US)

(72) Inventors: Paul W. Dent, Pittsboro, NC (US);
Curtis Davis, St. Louis, MO (US);
Murtaza Ali, Cedar Park, TX (US);
Frederick Rush, Auburn, AL (US);
Monier Maher, St. Louis, MO (US);
Marius Goldenberg, Austin, TX (US)

(73) Assignee: Robert Bosch Gmbh, Gerlingen (DE)

( * ) Notice: Subject to any disclaimer, the term of this
patent is extended or adjusted under 35
U.S.C. 154(b) by 220 days.

(21) Appl. No.: 17/582,672

(22) Filed: Jan. 24, 2022

(65) Prior Publication Data

US 2022/0236369 A1     Jul. 28, 2022

Related U.S. Application Data

(60) Provisional application No. 63/141,020, filed on Jan.
25, 2021.

(51) Int. Cl.
G01S 7/02 (2006.01)
G01S 7/41 (2006.01)
G01S 13/931 (2020.01)

(52) U.S. Cl.
CPC .............. G01S 7/024 (2013.01); G01S 7/414
(2013.01); G01S 13/931 (2013.01); *G01S*
*2013/93271* (2020.01); *G01S 2013/93272*
(2020.01)

(58) Field of Classification Search
CPC ........ G01S 7/024; G01S 7/414; G01S 13/931;
G01S 2013/93271; G01S 2013/93272
(Continued)

(56) References Cited

U.S. PATENT DOCUMENTS

| | | | |
|---|---|---|---|
| 1,882,128 A | 10/1932 | Fearing | |
| 3,374,478 A | 3/1968 | Blau | |

(Continued)

FOREIGN PATENT DOCUMENTS

| | | |
|---|---|---|
| EP | 0509843 | 10/1992 |
| EP | 1826586 | 8/2007 |

(Continued)

OTHER PUBLICATIONS

Chambers et al., An article entitled "Real-Time Vehicle Mounted
Multistatic Ground Penetrating Radar Imaging System for Buried
Object Detection," Lawrence Livermore National Laboratory Reports
(LLNL-TR-615452), Feb. 4, 2013; Retrieved from the Internet from
https://e-reports-ext.llnl.gov/pdf/711892.pdf.

(Continued)

*Primary Examiner* — Samarina Makhdoom
(74) *Attorney, Agent, or Firm* — Gardner, Linn, Burkhart
& Ondersma LLP

(57) ABSTRACT

A radar system with a transmit pipeline transmitting radio
signals, and with a receive pipeline receiving radio signals
including radio signals transmitted by own transmitters and
reflected from objects in an environment, and interfering
radio signals transmitted by other radar systems. The receive
pipeline provides interference immunity from interfering
radio signals transmitted by other radar systems. The trans-
mit pipeline and/or the receive pipeline avoid transmitting
radio signals that interfere with the other radar systems. The
receive pipeline includes dual polarization receive channels.
The interfering radio signals are a different polarization than
the radio signals transmitted by own transmitters and
reflected from targets in the environment. The receive pipe-
line provides improved signal handling dynamic range to
avoid receive channels saturating at A-to-D converter stage (Continued)

before the radio signal has reached the digital signal processing domain.

18 Claims, 5 Drawing Sheets

(58) Field of Classification Search
    USPC ......................................................... 342/188
    See application file for complete search history.

(56)                      References Cited

U.S. PATENT DOCUMENTS

| | | | |
|---|---|---|---|
| 3,735,398 A | 5/1973 | Ross | |
| 3,750,169 A | 7/1973 | Strenglein | |
| 3,766,554 A | 10/1973 | Tresselt | |
| 3,896,434 A | 7/1975 | Sirven | |
| 3,932,871 A | 1/1976 | Foote | |
| 4,078,234 A | 3/1978 | Fishbein et al. | |
| 4,176,351 A | 11/1979 | Vita et al. | |
| 4,308,536 A | 12/1981 | Sims, Jr. et al. | |
| 4,566,010 A | 1/1986 | Collins | |
| 4,612,547 A | 9/1986 | Itoh | |
| 4,882,668 A | 11/1989 | Schmid et al. | |
| 4,910,464 A | 3/1990 | Trett et al. | |
| 4,939,685 A | 7/1990 | Feintuch | |
| 5,001,486 A | 3/1991 | Bächtiger | |
| 5,012,254 A | 4/1991 | Thompson | |
| 5,034,906 A | 7/1991 | Chang | |
| 5,087,918 A | 2/1992 | May et al. | |
| 5,151,702 A | 9/1992 | Urkowitz | |
| 5,175,710 A | 12/1992 | Hutson | |
| 5,218,619 A | 6/1993 | Dent | |
| 5,272,663 A | 12/1993 | Jones et al. | |
| 5,280,288 A | 1/1994 | Sherry et al. | |
| 5,302,956 A | 4/1994 | Asbury et al. | |
| 5,311,192 A * | 5/1994 | Varga | G01S 7/36 |
| | | | 342/19 |
| 5,341,141 A | 8/1994 | Frazier et al. | |
| 5,345,470 A | 9/1994 | Alexander | |
| 5,361,072 A | 11/1994 | Barrick et al. | |
| 5,376,939 A | 12/1994 | Urkowitz | |
| 5,379,322 A | 1/1995 | Kosaka et al. | |
| 5,436,872 A | 7/1995 | Gilmour et al. | |
| 5,497,162 A | 3/1996 | Kaiser | |
| 5,508,706 A | 4/1996 | Tsou et al. | |
| 5,581,464 A | 12/1996 | Woll et al. | |
| 5,654,715 A | 8/1997 | Hayashikura et al. | |
| 5,657,021 A | 8/1997 | Ehsani-Nategh et al. | |
| 5,657,023 A | 8/1997 | Lewis et al. | |
| 5,682,605 A | 10/1997 | Salter | |
| 5,691,724 A | 11/1997 | Aker et al. | |
| 5,712,640 A | 1/1998 | Andou | |
| 5,724,041 A | 3/1998 | Inoue et al. | |
| 5,847,661 A | 12/1998 | Ricci | |
| 5,872,540 A * | 2/1999 | Casabona | G01S 1/045 |
| | | | 455/283 |
| 5,892,477 A | 4/1999 | Wehling | |
| 5,917,430 A | 6/1999 | Greneker, III et al. | |
| 5,920,285 A | 7/1999 | Benjamin | |
| 5,931,893 A | 8/1999 | Dent et al. | |
| 5,959,571 A | 9/1999 | Aoyagi et al. | |
| 5,969,661 A | 10/1999 | Benjamin | |
| 5,970,400 A | 10/1999 | Dwyer | |
| 6,048,315 A | 4/2000 | Chiao et al. | |
| 6,067,314 A | 5/2000 | Azuma | |
| 6,069,581 A | 5/2000 | Bell et al. | |
| 6,121,872 A | 9/2000 | Weishaupt | |
| 6,121,918 A | 9/2000 | Tullsson | |
| 6,151,366 A | 11/2000 | Yip | |
| 6,163,252 A | 12/2000 | Nishiwaki | |
| 6,184,829 B1 | 2/2001 | Stilp | |
| 6,191,726 B1 | 2/2001 | Tullsson | |
| 6,208,248 B1 | 3/2001 | Ross | |
| 6,288,672 B1 | 9/2001 | Asano et al. | |
| 6,307,622 B1 | 10/2001 | Lewis | |
| 6,335,700 B1 | 1/2002 | Ashihara | |
| 6,347,264 B2 | 2/2002 | Nicosia et al. | |
| 6,396,436 B1 | 5/2002 | Lissel et al. | |
| 6,400,308 B1 | 6/2002 | Bell et al. | |
| 6,411,250 B1 | 6/2002 | Oswald et al. | |
| 6,417,796 B1 | 7/2002 | Bowlds | |
| 6,424,289 B2 | 7/2002 | Fukae et al. | |
| 6,547,733 B2 | 4/2003 | Hwang et al. | |
| 6,583,753 B1 | 6/2003 | Reed | |
| 6,614,387 B1 | 9/2003 | Deadman | |
| 6,624,784 B1 | 9/2003 | Yamaguchi | |
| 6,674,908 B1 | 1/2004 | Aronov | |
| 6,683,560 B2 | 1/2004 | Bauhahn | |
| 6,693,582 B2 | 2/2004 | Steinlechner et al. | |
| 6,714,956 B1 | 3/2004 | Liu et al. | |
| 6,747,595 B2 | 6/2004 | Hirabe | |
| 6,768,391 B1 | 7/2004 | Dent et al. | |
| 6,865,218 B1 | 3/2005 | Sourour | |
| 6,867,732 B1 | 3/2005 | Chen et al. | |
| 6,888,491 B2 | 5/2005 | Richter | |
| 6,975,246 B1 | 12/2005 | Trudeau | |
| 7,066,886 B2 | 6/2006 | Song et al. | |
| 7,119,739 B1 | 10/2006 | Struckman | |
| 7,130,663 B2 | 10/2006 | Guo | |
| 7,202,776 B2 | 4/2007 | Breed | |
| 7,289,058 B2 | 10/2007 | Shima | |
| 7,299,251 B2 | 11/2007 | Skidmore et al. | |
| 7,338,450 B2 | 3/2008 | Kristofferson et al. | |
| 7,395,084 B2 | 7/2008 | Anttila | |
| 7,460,055 B2 | 12/2008 | Nishijima et al. | |
| 7,474,258 B1 | 1/2009 | Arikan et al. | |
| 7,545,310 B2 | 6/2009 | Matsuoka | |
| 7,545,321 B2 | 6/2009 | Kawasaki | |
| 7,564,400 B2 | 7/2009 | Fukuda | |
| 7,567,204 B2 | 7/2009 | Sakamoto | |
| 7,609,198 B2 | 10/2009 | Chang | |
| 7,642,952 B2 | 1/2010 | Fukuda | |
| 7,663,533 B2 | 2/2010 | Toennesen | |
| 7,667,637 B2 | 2/2010 | Pedersen et al. | |
| 7,728,762 B2 | 6/2010 | Sakamoto | |
| 7,791,528 B2 | 9/2010 | Klotzbuecher | |
| 7,847,731 B2 | 12/2010 | Wiesbeck et al. | |
| 7,855,677 B2 | 12/2010 | Negoro et al. | |
| 7,859,450 B2 | 12/2010 | Shirakawa et al. | |
| 8,019,352 B2 | 9/2011 | Rappaport et al. | |
| 8,044,845 B2 | 10/2011 | Saunders | |
| 8,049,663 B2 | 11/2011 | Frank et al. | |
| 8,059,026 B1 | 11/2011 | Nunez | |
| 8,102,306 B2 | 1/2012 | Smith, Jr. et al. | |
| 8,115,672 B2 | 2/2012 | Nouvel et al. | |
| 8,154,436 B2 | 4/2012 | Szajnowski | |
| 8,169,359 B2 | 5/2012 | Aoyagi | |
| 8,212,713 B2 | 7/2012 | Aiga et al. | |
| 8,330,650 B2 | 12/2012 | Goldman | |
| 8,390,507 B2 | 3/2013 | Wintermantel | |
| 8,471,760 B2 | 6/2013 | Szajnowski | |
| 8,532,159 B2 | 9/2013 | Kagawa et al. | |
| 8,547,988 B2 | 10/2013 | Hadani et al. | |
| 8,686,894 B2 | 4/2014 | Fukuda et al. | |
| 8,694,306 B1 | 4/2014 | Short et al. | |
| 8,994,581 B1 | 3/2015 | Brown | |
| 9,121,943 B2 | 9/2015 | Stirlin-Gallacher et al. | |
| 9,182,479 B2 | 11/2015 | Chen et al. | |
| 9,239,378 B2 | 1/2016 | Kishigami et al. | |
| 9,239,379 B2 | 1/2016 | Burgio et al. | |
| 9,274,217 B2 | 3/2016 | Chang et al. | |
| 9,282,945 B2 | 3/2016 | Smith et al. | |
| 9,335,402 B2 | 5/2016 | Maeno et al. | |
| 9,400,328 B2 | 7/2016 | Hsiao et al. | |
| 9,541,639 B2 | 1/2017 | Searcy et al. | |
| 9,568,600 B2 | 2/2017 | Alland | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,720,073 B1 | 8/2017 | Davis et al. | |
| 9,720,080 B1 | 8/2017 | Rodenbeck | |
| 9,753,121 B1 | 9/2017 | Davis | |
| 9,753,132 B1 | 9/2017 | Bordes et al. | |
| 9,772,397 B1 | 9/2017 | Bordes et al. | |

(56) References Cited

U.S. PATENT DOCUMENTS

| | | |
|---|---|---|
| 9,791,551 B1 | 10/2017 | Eshraghi et al. |
| 9,791,564 B1 | 10/2017 | Harris et al. |
| 9,806,914 B1 | 10/2017 | Bordes et al. |
| 9,829,567 B1 | 11/2017 | Davis et al. |
| 9,846,228 B2 | 12/2017 | Davis et al. |
| 9,869,762 B1 | 1/2018 | Alland et al. |
| 9,954,955 B2 | 4/2018 | Davis et al. |
| 9,989,627 B2 | 6/2018 | Eshraghi et al. |
| 10,090,585 B2 | 10/2018 | Dinc et al. |
| 10,092,192 B2 | 10/2018 | Lashkari et al. |
| 10,215,853 B2 | 2/2019 | Stark et al. |
| 10,305,611 B1 | 5/2019 | Rimini et al. |
| 10,536,529 B2 | 1/2020 | Davis et al. |
| 10,852,408 B2 | 12/2020 | Aslett et al. |
| 11,105,890 B2 | 8/2021 | Behrens et al. |
| 11,271,328 B2 | 3/2022 | Liu et al. |
| 2001/0002919 A1 | 6/2001 | Sourour et al. |
| 2002/0004692 A1 | 1/2002 | Nicosia et al. |
| 2002/0044082 A1 | 4/2002 | Woodington et al. |
| 2002/0075178 A1 | 6/2002 | Woodington et al. |
| 2002/0118522 A1 | 8/2002 | Ho et al. |
| 2002/0130811 A1 | 9/2002 | Voigtlaender |
| 2002/0147534 A1 | 10/2002 | Delcheccolo et al. |
| 2002/0155811 A1 | 10/2002 | Prismantas |
| 2003/0001772 A1 | 1/2003 | Woodington et al. |
| 2003/0011519 A1 | 1/2003 | Breglia et al. |
| 2003/0058166 A1 | 3/2003 | Hirabe |
| 2003/0073463 A1 | 4/2003 | Shapira |
| 2003/0080713 A1 | 5/2003 | Kirmuss |
| 2003/0102997 A1 | 6/2003 | Levin et al. |
| 2003/0164791 A1 | 9/2003 | Shinoda et al. |
| 2003/0235244 A1 | 12/2003 | Pessoa et al. |
| 2004/0012516 A1 | 1/2004 | Schiffmann |
| 2004/0015529 A1 | 1/2004 | Tanrikulu et al. |
| 2004/0066323 A1 | 4/2004 | Richter |
| 2004/0070532 A1 | 4/2004 | Ishii et al. |
| 2004/0107030 A1 | 6/2004 | Nishira et al. |
| 2004/0138802 A1 | 7/2004 | Kuragaki et al. |
| 2004/0215373 A1 | 10/2004 | Won et al. |
| 2004/0229590 A1 | 11/2004 | Kubo et al. |
| 2005/0001757 A1 | 1/2005 | Shinoda et al. |
| 2005/0008065 A1 | 1/2005 | Schilling |
| 2005/0069162 A1 | 3/2005 | Haykin |
| 2005/0078739 A1 | 4/2005 | Korpet et al. |
| 2005/0090274 A1 | 4/2005 | Miyashita |
| 2005/0156780 A1 | 7/2005 | Bonthron et al. |
| 2005/0201457 A1 | 9/2005 | Allred et al. |
| 2005/0225476 A1 | 10/2005 | Hoetzel et al. |
| 2005/0273480 A1 | 12/2005 | Pugh et al. |
| 2006/0012511 A1 | 1/2006 | Dooi et al. |
| 2006/0036353 A1 | 2/2006 | Wintermantel |
| 2006/0050707 A1 | 3/2006 | Sterin |
| 2006/0093078 A1 | 5/2006 | Lewis et al. |
| 2006/0109170 A1 | 5/2006 | Voigtlaender et al. |
| 2006/0109931 A1 | 5/2006 | Asai |
| 2006/0114324 A1 | 6/2006 | Farmer et al. |
| 2006/0140249 A1 | 6/2006 | Kohno |
| 2006/0181448 A1 | 8/2006 | Natsume et al. |
| 2006/0220943 A1 | 10/2006 | Schlick et al. |
| 2006/0244653 A1 | 11/2006 | Szajnowski |
| 2006/0262007 A1 | 11/2006 | Bonthron |
| 2006/0262009 A1 | 11/2006 | Watanabe |
| 2007/0018884 A1 | 1/2007 | Adams |
| 2007/0018886 A1 | 1/2007 | Watanabe et al. |
| 2007/0046558 A1 | 3/2007 | Tillery |
| 2007/0096885 A1 | 5/2007 | Cheng et al. |
| 2007/0109175 A1 | 5/2007 | Fukuda |
| 2007/0115869 A1 | 5/2007 | Lakkis |
| 2007/0120731 A1 | 5/2007 | Kelly, Jr. et al. |
| 2007/0132633 A1 | 6/2007 | Uchino |
| 2007/0152870 A1 | 7/2007 | Woodington et al. |
| 2007/0152871 A1 | 7/2007 | Puglia |
| 2007/0152872 A1 | 7/2007 | Woodington |
| 2007/0164896 A1 | 7/2007 | Suzuki et al. |
| 2007/0171122 A1 | 7/2007 | Nakano |
| 2007/0182619 A1 | 8/2007 | Honda et al. |
| 2007/0182623 A1 | 8/2007 | Zeng |
| 2007/0188373 A1 | 8/2007 | Shirakawa et al. |
| 2007/0200747 A1 | 8/2007 | Okai |
| 2007/0263748 A1 | 11/2007 | Mesecher |
| 2007/0279303 A1 | 12/2007 | Schoebel |
| 2008/0080599 A1 | 4/2008 | Kang |
| 2008/0088499 A1 | 4/2008 | Bonthron |
| 2008/0094274 A1 | 4/2008 | Nakanishi |
| 2008/0150790 A1 | 6/2008 | Voigtlaender et al. |
| 2008/0180311 A1 | 7/2008 | Mikami |
| 2008/0208472 A1 | 8/2008 | Morcom |
| 2008/0218406 A1 | 9/2008 | Nakanishi |
| 2008/0258964 A1 | 10/2008 | Schoeberl |
| 2008/0272955 A1 | 11/2008 | Yonak et al. |
| 2009/0003412 A1 | 1/2009 | Negoro et al. |
| 2009/0015459 A1 | 1/2009 | Mahler et al. |
| 2009/0015464 A1 | 1/2009 | Fukuda |
| 2009/0027257 A1 | 1/2009 | Arikan |
| 2009/0046000 A1 | 2/2009 | Matsuoka |
| 2009/0051581 A1 | 2/2009 | Hatono |
| 2009/0072957 A1 | 3/2009 | Wu et al. |
| 2009/0073025 A1 | 3/2009 | Inoue et al. |
| 2009/0074031 A1 | 3/2009 | Fukuda |
| 2009/0079617 A1 | 3/2009 | Shirakawa et al. |
| 2009/0085827 A1 | 4/2009 | Orime et al. |
| 2009/0103593 A1 | 4/2009 | Bergamo |
| 2009/0121918 A1* | 5/2009 | Shirai ..................... G01S 7/023 |
| | | 342/159 |
| 2009/0141775 A1* | 6/2009 | Kober .................. H04B 1/1027 |
| | | 342/194 |
| 2009/0212998 A1 | 8/2009 | Szajnowski |
| 2009/0237293 A1 | 9/2009 | Sakuma |
| 2009/0254260 A1 | 10/2009 | Nix et al. |
| 2009/0267822 A1 | 10/2009 | Shinoda et al. |
| 2009/0289831 A1 | 11/2009 | Akita |
| 2009/0295623 A1 | 12/2009 | Falk |
| 2010/0001897 A1 | 1/2010 | Lyman |
| 2010/0019950 A1 | 1/2010 | Yamano et al. |
| 2010/0026574 A1 | 2/2010 | Pozgay |
| 2010/0039311 A1 | 2/2010 | Woodington et al. |
| 2010/0039313 A1 | 2/2010 | Morris |
| 2010/0116365 A1 | 5/2010 | McCarty |
| 2010/0156690 A1 | 6/2010 | Kim et al. |
| 2010/0166121 A1 | 7/2010 | Kenney, Jr. |
| 2010/0198513 A1 | 8/2010 | Zeng et al. |
| 2010/0202495 A1 | 8/2010 | Kagawa et al. |
| 2010/0253573 A1 | 10/2010 | Holzheimer et al. |
| 2010/0277359 A1 | 11/2010 | Ando |
| 2010/0289692 A1 | 11/2010 | Winkler |
| 2011/0006944 A1 | 1/2011 | Goldman |
| 2011/0032138 A1 | 2/2011 | Krapf |
| 2011/0074620 A1 | 3/2011 | Wintermantel |
| 2011/0187600 A1 | 8/2011 | Landt |
| 2011/0196568 A1 | 8/2011 | Nickolaou |
| 2011/0234448 A1 | 9/2011 | Hayase |
| 2011/0248796 A1 | 10/2011 | Pozgay |
| 2011/0279303 A1 | 11/2011 | Smith, Jr. et al. |
| 2011/0279307 A1 | 11/2011 | Song |
| 2011/0285576 A1 | 11/2011 | Lynam |
| 2011/0291874 A1 | 12/2011 | De Mersseman |
| 2011/0291875 A1 | 12/2011 | Szajnowski |
| 2011/0292971 A1* | 12/2011 | Hadani ................. H04L 5/0044 |
| | | 375/132 |
| 2011/0298653 A1 | 12/2011 | Mizutani |
| 2012/0001791 A1 | 1/2012 | Wintermantel |
| 2012/0050092 A1 | 3/2012 | Lee et al. |
| 2012/0050093 A1 | 3/2012 | Heilmann et al. |
| 2012/0105268 A1 | 5/2012 | Smits et al. |
| 2012/0112957 A1 | 5/2012 | Nguyen et al. |
| 2012/0133547 A1 | 5/2012 | MacDonald et al. |
| 2012/0146834 A1 | 6/2012 | Karr |
| 2012/0173246 A1 | 7/2012 | Choi et al. |
| 2012/0195349 A1 | 8/2012 | Lakkis |
| 2012/0249356 A1 | 10/2012 | Shope |
| 2012/0257643 A1 | 10/2012 | Wu et al. |
| 2012/0283987 A1 | 11/2012 | Busking et al. |
| 2012/0314799 A1 | 12/2012 | In De Betou et al. |
| 2012/0319900 A1 | 12/2012 | Johansson et al. |

(56) References Cited

U.S. PATENT DOCUMENTS

| | | |
|---|---|---|
| 2013/0016761 A1 | 1/2013 | Nentwig |
| 2013/0021196 A1 | 1/2013 | Himmelstoss |
| 2013/0027240 A1 | 1/2013 | Chowdhury |
| 2013/0057436 A1 | 3/2013 | Krasner et al. |
| 2013/0069818 A1 | 3/2013 | Shirakawa et al. |
| 2013/0102254 A1* | 4/2013 | Cyzs ................. H04B 1/10 |
| | | 455/63.1 |
| 2013/0113647 A1 | 5/2013 | Sentelle et al. |
| 2013/0113652 A1 | 5/2013 | Smits et al. |
| 2013/0113653 A1 | 5/2013 | Kishigami et al. |
| 2013/0135140 A1 | 5/2013 | Kishigami |
| 2013/0169468 A1 | 7/2013 | Johnson et al. |
| 2013/0169485 A1 | 7/2013 | Lynch |
| 2013/0176154 A1 | 7/2013 | Bonaccio et al. |
| 2013/0214961 A1 | 8/2013 | Lee et al. |
| 2013/0229301 A1 | 9/2013 | Kanamoto |
| 2013/0244710 A1 | 9/2013 | Nguyen et al. |
| 2013/0249730 A1 | 9/2013 | Adcook |
| 2013/0314271 A1 | 11/2013 | Braswell et al. |
| 2013/0321196 A1 | 12/2013 | Binzer et al. |
| 2014/0022108 A1 | 1/2014 | Alberth, Jr. et al. |
| 2014/0028491 A1 | 1/2014 | Ferguson |
| 2014/0035774 A1 | 2/2014 | Khlifi |
| 2014/0049423 A1 | 2/2014 | De Jong et al. |
| 2014/0070985 A1 | 3/2014 | Vacanti |
| 2014/0085128 A1 | 3/2014 | Kishigami et al. |
| 2014/0097987 A1 | 4/2014 | Worl et al. |
| 2014/0111367 A1 | 4/2014 | Kishigami et al. |
| 2014/0111372 A1 | 4/2014 | Wu |
| 2014/0139322 A1 | 5/2014 | Wang et al. |
| 2014/0159948 A1 | 6/2014 | Ishimori et al. |
| 2014/0168004 A1 | 6/2014 | Chen et al. |
| 2014/0218240 A1 | 8/2014 | Kpodzo et al. |
| 2014/0220903 A1 | 8/2014 | Schulz et al. |
| 2014/0253345 A1 | 9/2014 | Breed |
| 2014/0253364 A1 | 9/2014 | Lee et al. |
| 2014/0285373 A1 | 9/2014 | Kuwahara et al. |
| 2014/0301495 A1 | 10/2014 | Sohn et al. |
| 2014/0316261 A1 | 10/2014 | Lux et al. |
| 2014/0327566 A1 | 11/2014 | Burgio et al. |
| 2014/0340254 A1 | 11/2014 | Hesse |
| 2014/0348253 A1 | 11/2014 | Mobasher et al. |
| 2014/0350815 A1 | 11/2014 | Kambe |
| 2015/0002329 A1 | 1/2015 | Murad et al. |
| 2015/0002357 A1 | 1/2015 | Sanford et al. |
| 2015/0035662 A1 | 2/2015 | Bowers et al. |
| 2015/0061922 A1 | 3/2015 | Kishigami |
| 2015/0103745 A1 | 4/2015 | Negus et al. |
| 2015/0153445 A1 | 6/2015 | Jansen |
| 2015/0160335 A1 | 6/2015 | Lynch et al. |
| 2015/0198709 A1 | 7/2015 | Inoue |
| 2015/0204966 A1 | 7/2015 | Kishigami |
| 2015/0204971 A1 | 7/2015 | Yoshimura et al. |
| 2015/0204972 A1 | 7/2015 | Kuehnle et al. |
| 2015/0226838 A1 | 8/2015 | Hayakawa |
| 2015/0226848 A1 | 8/2015 | Park |
| 2015/0234045 A1 | 8/2015 | Rosenblum |
| 2015/0247924 A1 | 9/2015 | Kishigami |
| 2015/0255867 A1 | 9/2015 | Inoue |
| 2015/0301172 A1 | 10/2015 | Ossowska |
| 2015/0323660 A1 | 11/2015 | Hampikian |
| 2015/0331090 A1 | 11/2015 | Jeong et al. |
| 2015/0369912 A1 | 12/2015 | Kishigami et al. |
| 2015/0373167 A1 | 12/2015 | Murashov et al. |
| 2016/0003938 A1 | 1/2016 | Gazit et al. |
| 2016/0003939 A1 | 1/2016 | Stainvas Olshansky et al. |
| 2016/0018511 A1 | 1/2016 | Nayyar et al. |
| 2016/0025844 A1 | 1/2016 | Mckitterick et al. |
| 2016/0033623 A1 | 2/2016 | Holder |
| 2016/0033631 A1 | 2/2016 | Searcy et al. |
| 2016/0033632 A1 | 2/2016 | Searcy et al. |
| 2016/0041260 A1 | 2/2016 | Cao et al. |
| 2016/0054441 A1 | 2/2016 | Kuo et al. |
| 2016/0061935 A1 | 3/2016 | McCloskey et al. |
| 2016/0084941 A1 | 3/2016 | Arage |
| 2016/0084943 A1 | 3/2016 | Arage |
| 2016/0091595 A1 | 3/2016 | Alcalde |
| 2016/0103206 A1 | 4/2016 | Pavao-Moreira et al. |
| 2016/0124075 A1 | 5/2016 | Vogt et al. |
| 2016/0124086 A1 | 5/2016 | Jansen et al. |
| 2016/0131752 A1 | 5/2016 | Jansen et al. |
| 2016/0139254 A1 | 5/2016 | Wittenberg |
| 2016/0146931 A1 | 5/2016 | Rao et al. |
| 2016/0154103 A1 | 6/2016 | Moriuchi |
| 2016/0157828 A1 | 6/2016 | Sumi et al. |
| 2016/0178732 A1 | 6/2016 | Oka et al. |
| 2016/0213258 A1 | 7/2016 | Lashkari et al. |
| 2016/0223644 A1 | 8/2016 | Soga |
| 2016/0238694 A1 | 8/2016 | Kishigami |
| 2016/0245909 A1 | 8/2016 | Aslett et al. |
| 2016/0349365 A1 | 12/2016 | Ling |
| 2017/0010361 A1 | 1/2017 | Tanaka |
| 2017/0023661 A1 | 1/2017 | Richert |
| 2017/0023663 A1 | 1/2017 | Subburaj et al. |
| 2017/0074980 A1 | 3/2017 | Adib |
| 2017/0090015 A1 | 3/2017 | Breen et al. |
| 2017/0117950 A1 | 4/2017 | Strong |
| 2017/0153316 A1 | 6/2017 | Wintermantel |
| 2017/0176583 A1 | 6/2017 | Gulden et al. |
| 2017/0212213 A1 | 7/2017 | Kishigami |
| 2017/0219689 A1 | 8/2017 | Hung et al. |
| 2017/0234968 A1 | 8/2017 | Roger et al. |
| 2017/0293025 A1 | 10/2017 | Davis et al. |
| 2017/0293027 A1* | 10/2017 | Stark ................. G01S 13/87 |
| 2017/0307728 A1 | 10/2017 | Eshraghi et al. |
| 2017/0307729 A1* | 10/2017 | Eshraghi ............. G01S 7/2813 |
| 2017/0309997 A1 | 10/2017 | Alland et al. |
| 2017/0310758 A1 | 10/2017 | Davis et al. |
| 2017/0336495 A1 | 11/2017 | Davis et al. |
| 2017/0338874 A1 | 11/2017 | Pratt et al. |
| 2017/0353210 A1 | 12/2017 | Pratt et al. |
| 2018/0003799 A1 | 1/2018 | Yang et al. |
| 2018/0019755 A1 | 1/2018 | Josefsberg et al. |
| 2018/0062258 A1 | 3/2018 | Timofeev et al. |
| 2018/0074168 A1 | 3/2018 | Subburaj et al. |
| 2018/0095163 A1 | 4/2018 | Lovberg et al. |
| 2018/0113191 A1 | 4/2018 | Villeval et al. |
| 2018/0115371 A1 | 4/2018 | Trotta et al. |
| 2018/0149730 A1 | 5/2018 | Li et al. |
| 2018/0175907 A1 | 6/2018 | Marr |
| 2018/0252809 A1 | 9/2018 | Davis et al. |
| 2018/0294908 A1 | 10/2018 | Abdelmonem |
| 2018/0356506 A1 | 12/2018 | Bilik et al. |
| 2018/0358706 A1 | 12/2018 | Kildal et al. |
| 2018/0374346 A1 | 12/2018 | Fowe |
| 2019/0056476 A1 | 2/2019 | Lin |
| 2019/0064364 A1 | 2/2019 | Boysel et al. |
| 2019/0072641 A1 | 3/2019 | Al-Stouhi et al. |
| 2019/0140364 A1 | 5/2019 | Mirmozafari et al. |
| 2019/0178983 A1 | 6/2019 | Lin et al. |
| 2019/0219685 A1 | 7/2019 | Shan |
| 2019/0324134 A1 | 10/2019 | Cattle |
| 2019/0383929 A1 | 12/2019 | Melzer et al. |
| 2020/0064455 A1 | 2/2020 | Schroder et al. |
| 2020/0150256 A1 | 5/2020 | Dent et al. |
| 2020/0191939 A1 | 6/2020 | Wu et al. |
| 2020/0225317 A1* | 7/2020 | Chen ................. G01S 7/417 |
| 2020/0292666 A1 | 9/2020 | Maher et al. |
| 2020/0393536 A1* | 12/2020 | Stettiner ............. G01S 13/343 |
| 2021/0231771 A1 | 7/2021 | Bengtsson |
| 2021/0296783 A1 | 9/2021 | Rostomyan |
| 2022/0146665 A1 | 5/2022 | Vollbracht et al. |
| 2022/0146666 A1 | 5/2022 | Vollbracht et al. |
| 2022/0390550 A1 | 12/2022 | Markel et al. |
| 2023/0184883 A1 | 6/2023 | Li et al. |
| 2023/0387981 A1 | 11/2023 | Girnyk et al. |
| 2024/0000333 A1 | 1/2024 | Pratt et al. |

FOREIGN PATENT DOCUMENTS

| | | |
|---|---|---|
| EP | 0725480 | 11/2011 |
| EP | 2374217 | 4/2013 |
| EP | 2884299 | 6/2015 |
| EP | 2821808 | 7/2015 |

(56) References Cited

FOREIGN PATENT DOCUMENTS

| | | |
|---|---|---|
| FR | 2751086 | 1/1998 |
| JP | 2010243330 | 10/2010 |
| KR | 101010522 | 1/2011 |
| KR | 20180119922 | 11/2018 |
| KR | 102088426 | 3/2020 |
| WO | WO2008022981 | 2/2008 |
| WO | WO2015175078 | 11/2015 |
| WO | WO2015185058 | 12/2015 |
| WO | WO2016011407 | 1/2016 |
| WO | WO2016030656 | 3/2016 |
| WO | WO2017059961 | 4/2017 |
| WO | WO2017175190 | 10/2017 |
| WO | WO2017187330 | 11/2017 |

OTHER PUBLICATIONS

Fraser, "Design and simulation of a coded sequence ground penetrating radar," In: Diss. University of British Columbia, Dec. 3, 2015.

Zhou et al., "Linear extractors for extracting randomness from noisy sources," In: Information Theory Proceedings (ISIT), 2011 IEEE International Symposium on Oct. 3, 2011.

V. Giannini et al., "A 79 GHz Phase-Modulated 4 GHz-BW CW Radar Transmitter in 28 nm CMOS, "in IEEE Journal of Solid-State Circuits, vol. 49, No. 12, pp. 2925-2937, Dec. 2014. (Year: 2014).

Óscar Faus García, " Signal Processing for mm Wave MIMO Radar," University of Gavle, Faculty of Engineering and Sustainable Development, Jun. 2015; Retrieved from the Internet from http://www.diva-portal.se/smash/get/diva2:826028/FULLTEXT01.pdf.

Levanan Nadav et al., "Non-coherent pulse compression—aperiodic and periodic waveforms", IET Radar, Sonar & Navagation, The Institution of Engineering and Technology, Jan. 1, 2016, pp. 216-224, vol. 10, Iss. 1, UK.

Akihiro Kajiwara, "Stepped-FM Pulse Radar for Vehicular Collision Avoidance", Electronics and Communications in Japan, Part 1, Mar. 1998, pp. 234-239, vol. 82, No. 6 1999.

A. Bourdoux, U. Ahamd, D. Guermandi, S. Brebels, A. Dewilde, W. Van Thillo, PMCW "Waveform and MIMO Technique for a 79 GHz CMOS Automotive Radar", 2016 IEEE Radar Conference (RadarConf), 2016, pp. 1-5, doi: 10.1109/RADAR.2016.7485114. (Year: 2016).

V. Jain, F. Tzeng, L. Zhou and P. Heydari, "A single-Chip Dual-Band 22-29-GHz/77-81-GHz BiCMOS Transceiver for Automotive Radars, "in IEEE Journal of Solid-State Circuits, vol. 44, No. 12, pp. 3469-3485, Dec. 2009, doi: 10.1109/JSSC.2009.2032583. (Year: 2009).

A. Medra et al., "An 80 GHz Low-Noise Amplifier Resilient to the TX Spillover in Phase-Modulated Continuous-Wave Radars, "In IEEE Journal of Solid-State Circuits, vol. 51, No. 5, pp. 1141-1153, May 2016, doi: 10.1109/JSSC.2016.2520962. (Year: 2016).

International Search Report and Written Opinion of the International Searching Authority from corresponding Patent Cooperation Treaty (PCT) Application No. PCT/IB2022/050604, indicated completed on Oct. 19, 2022.

* cited by examiner

DUAL-POLARIZED MIMO RADAR

CROSS REFERENCE TO RELATED APPLICATIONS

The present application claims the filing benefits of U.S. provisional application, Ser. No. 63/141,020, filed Jan. 25, 2021, which is hereby incorporated by reference herein in its entirety.

FIELD OF THE INVENTION

The present invention is directed to radar systems, and more particularly to radar systems for vehicles and robotics.

BACKGROUND OF THE INVENTION

The use of radar to determine range, velocity, and angle (elevation or azimuth) of objects in an environment is important in a number of applications including automotive radar and gesture detection. Radar systems typically transmit a radio frequency (RF) signal and listen for the reflection of the radio signal from objects in the environment. A radar system estimates the location of objects, also called targets, in the environment by correlating delayed versions of the received radio signal with the transmitted radio signal. A radar system can also estimate the velocity of the target by Doppler processing. A radar system with multiple transmitters and multiple receivers can also determine the angular position of a target. Depending on antenna scanning and/or the number of antenna/receiver channels and their geometry, different angles (e.g., azimuth or elevation) can be determined.

A radar system consists of transmitters and receivers. The transmitters generate a baseband signal which is upconverted to a radio frequency (RF) signal that propagates according to an antenna pattern. The transmitted signal is reflected off of object or targets in the environment. The received signal at each receiver is the totality of the reflected signal from all targets in the environment. The receiver down converts the received signal to baseband and compares the baseband received signal to the baseband signal at one or more transmitters. This is used to determine the range, velocity, and angle of targets in the environment.

SUMMARY OF THE INVENTION

Embodiments of the present invention provide for a radar system that provides for greater immunity to interference from other radar systems, particularly from chirp radars. Exemplary embodiments also provide "good citizen" measures that help to reduce interference that might be caused to other radar systems. An exemplary radar system will include dual polarization receive channels in the expectation that interference will be a different polarization than the desired radio signals transmitted by own transmitters and reflected from targets in the environment. The radar system provides improved signal handling dynamic range to avoid receive channels saturating at the A-to-D converter stage before the radio signal has reached the digital signal processing domain.

In an aspect of the present invention, a radar system includes a transmit pipeline that includes a plurality of transmitters. The radar system also includes a receive pipeline that includes a plurality of receivers. The transmitters are configured to transmit radio signals. The receivers are configured to receive radio signals that include the transmitted radio signals transmitted by the transmitters and reflected from objects in the environment. The receive pipeline is configured to provide interference immunity from interfering radio signals transmitted by other radar systems.

In an aspect of the present invention, the interfering radar systems may be chirp radars.

In another aspect of the present invention, the transmit pipeline and/or the receive pipeline is configured to avoid transmitting radio signals that interfere with the other radar systems.

In a further aspect of the present invention, the receive pipeline comprises exemplary dual polarization receive channels. The interfering radio signals are a different polarization than the radio signals transmitted by the transmitters and reflected from targets in the environment.

In yet another aspect of the present invention, the receive pipeline is configured to provide improved signal handling dynamic range to avoid receive channels saturating at the A-to-D converter stage before the radio signal has reached the digital signal processing domain.

These and other objects, advantages, purposes and features of the present invention will become apparent upon review of the following specification in conjunction with the drawings.

DESCRIPTION OF THE PREFERRED EMBODIMENTS

Figure 1:
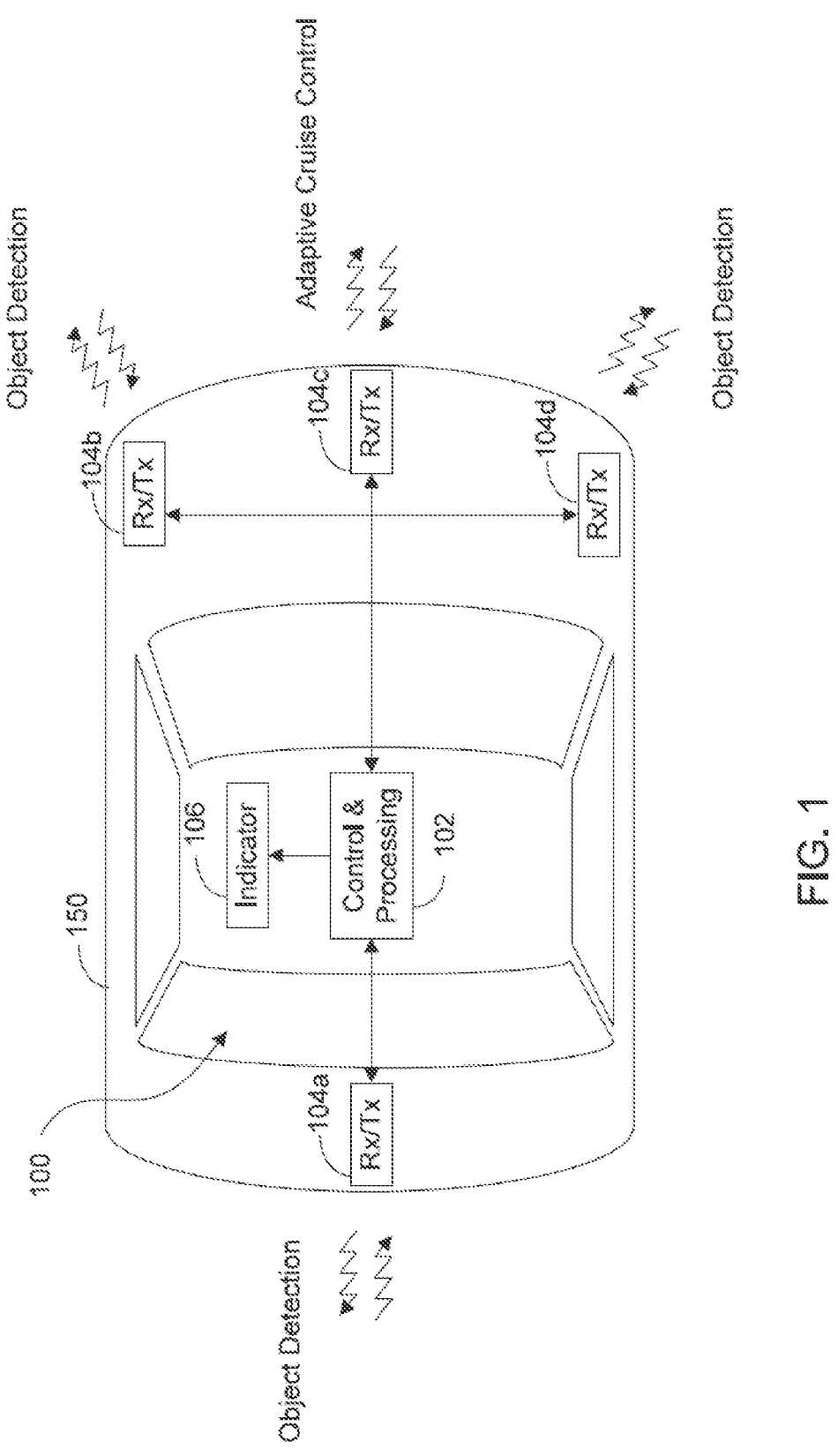
FIG. 1 is a plan view of an automobile equipped with a radar system in accordance with the present invention.

Referring to the drawings and the illustrative embodiments depicted therein, wherein numbered elements in the following written description correspond to like-numbered elements in the figures, a radar system provides for greater immunity to interference from other radar systems, particularly chirp radars. The exemplary radar system also provides "good citizen" measures that help to reduce interference that might be caused to other radar systems. The radar system will include exemplary dual polarization receive channels in the expectation that interference will be a different polarization than the desired radio signals transmitted by own transmitters and reflected from targets in the environment. The radar system also provides improved signal handling dynamic range to avoid receive channels saturating at the A-to-D converter stage before the radio signal has reached the digital signal processing domain.

FIG. 1 illustrates an exemplary radar system 100 configured for use in a vehicle 150. In an aspect of the present invention, a vehicle 150 may be an automobile, truck, or bus, etc. The radar system 100 may utilize multiple radar systems (e.g., 104a-104d) embedded in the vehicle 150 (see FIG. 1). Each of these radar systems may employ multiple transmitters, receivers, and antennas (see FIG. 3). These signals are reflected from objects (also known as targets) in the environment and received by one or more receivers of the radar system. A transmitter-receiver pair is called a virtual radar (or sometimes a virtual receiver). As illustrated in FIG. 1, the radar system 100 may comprise one or more transmitters and one or more receivers (104a-104d) for a plurality of virtual radars. Other configurations are also possible. FIG. 1 illustrates the receivers/transmitters 104a-104d placed to acquire and provide data for object detection and adaptive cruise control. As illustrated in FIG. 1, a controller 102 receives and then analyzes position information received from the receivers 104a-104d and forwards processed information (e.g., position information) to, for example, an indicator 106 or other similar devices, as well as to other automotive systems. The radar system 100 (providing such object detection and adaptive cruise control or the like) may be part of an Advanced Driver Assistance System (ADAS) for the automobile 150.

An exemplary radar system operates by transmitting one or more signals from one or more transmitters and then listening for reflections of those signals from objects in the environment by one or more receivers. By comparing the transmitted signals and the received signals, estimates of the range, velocity, and angle (azimuth and/or elevation) of the objects can be estimated.

Figure 2B:
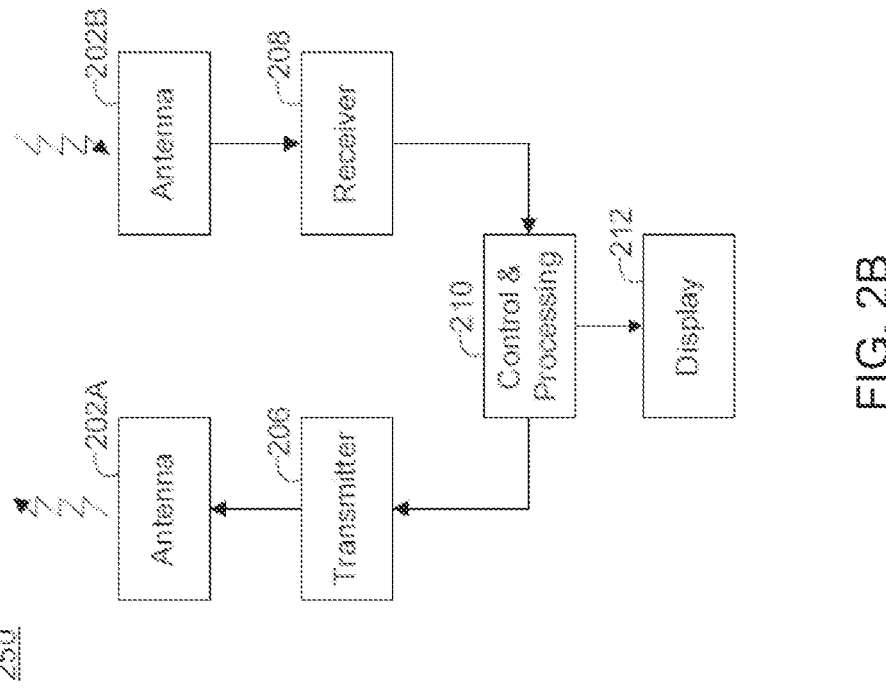
FIG. 2A and FIG. 2B are block diagrams of radar systems in accordance with the present invention.
Figure 2A:
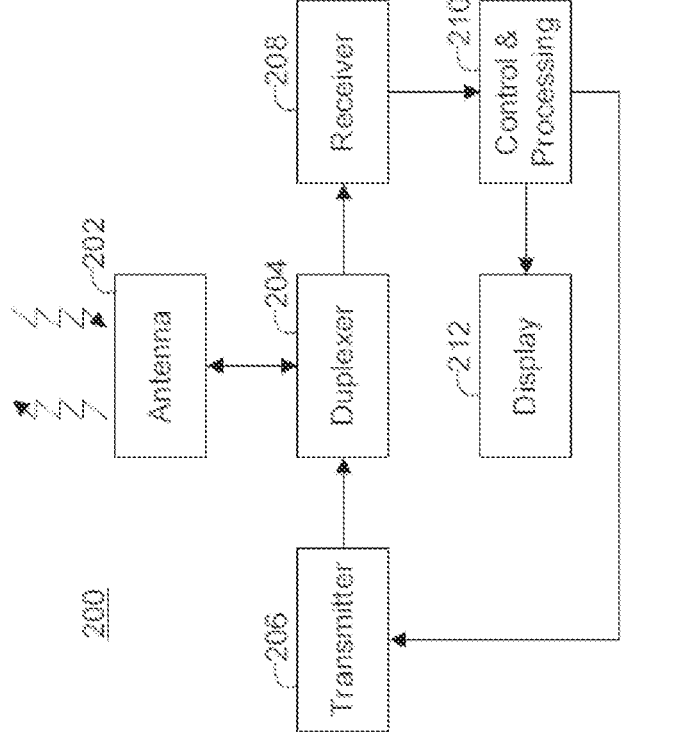

There are several ways to implement a radar system. One way, illustrated in FIG. 2A, uses a single antenna 202 for transmitting and receiving. The antenna 202 is connected to a duplexer 204 that routes the appropriate signal from the antenna 202 to a receiver 208 or routes the signal from a transmitter 206 to the antenna 202. A control processor 210 controls the operation of the transmitter 206 and the receiver 208 and estimates the range and velocity of objects in the environment. A second way to implement a radar system is shown in FIG. 2B. In this system, there are separate antennas for transmitting (202A) and receiving (202B). A control processor 210 performs the same basic functions as in FIG. 2A. In each case, there may be a display 212 to visualize the location of objects in the environment.

Figure 3:
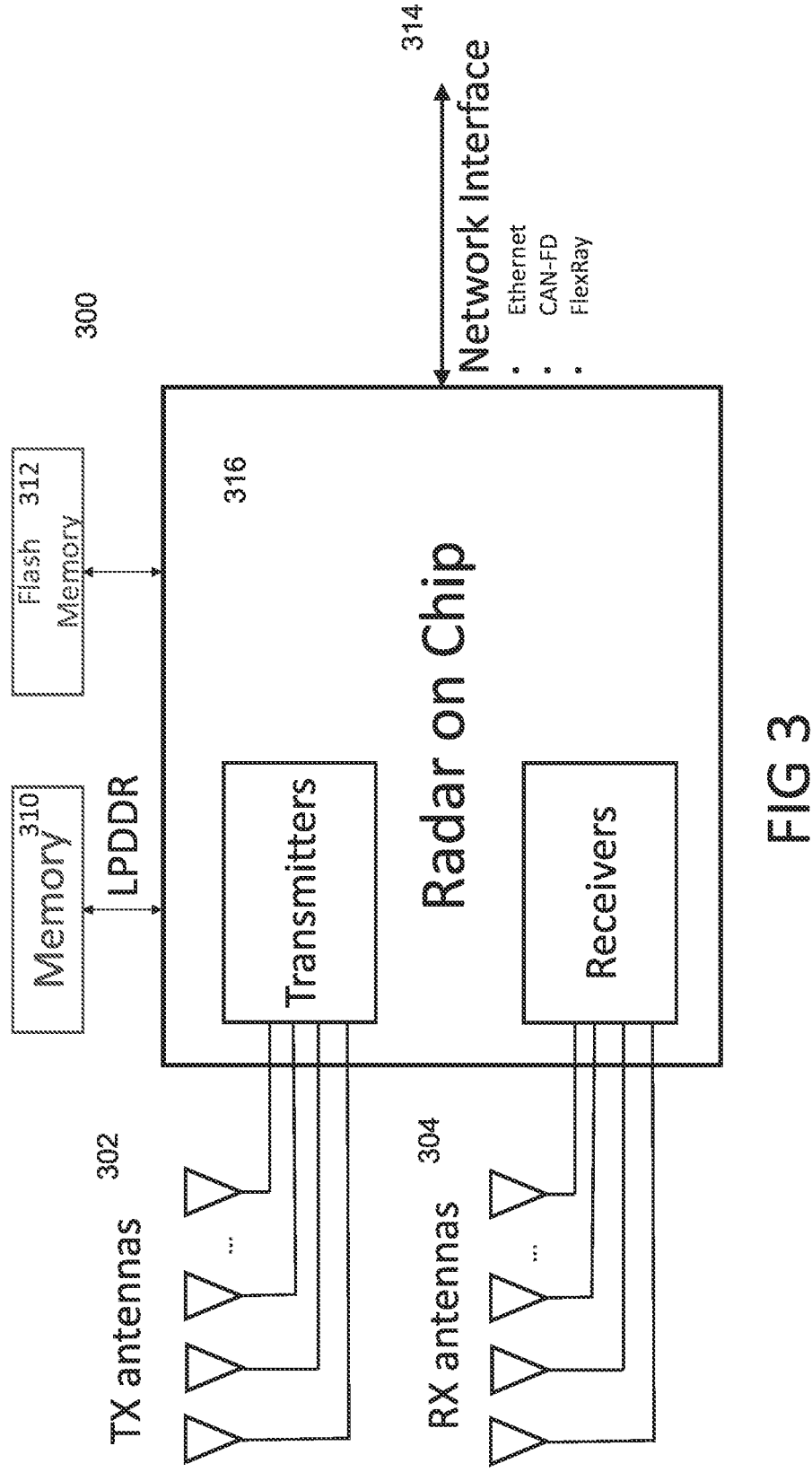
FIG. 3 is a block diagram illustrating a radar with a plurality of receivers and a plurality of transmitters (MIMO radar) in accordance with the present invention.

A radar system with multiple antennas, multiple transmitters, and multiple receivers is shown in FIG. 3. Using multiple antennas 302, 304 allows an exemplary radar system 300 to determine the angle (azimuth or elevation or both) of targets in the environment. Depending on the geometry of the antenna system, different angles (e.g., azimuth or elevation) can be determined.

The radar system 300 may be connected to a network via an Ethernet connection or other types of network connections 314, such as, for example, CAN-FD and FlexRay. The radar system 300 may also have memory (310, 312) to store software used for processing the signals in order to determine range, velocity, and location of objects. Memory 310, 312 may also be used to store information about targets in the environment. There may also be processing capability contained in the ASIC 208 apart from the transmitters 203 and receivers 204.

The description herein includes an exemplary radar system in which there are $N_T$ transmitters and $N_R$ receivers for $N_T \times N_R$ virtual radars, one for each transmitter-receiver pair. For example, a radar system with eight transmitters and eight receivers will have 64 pairs or 64 virtual radars (with 64 virtual receivers). When three transmitters (Tx1, Tx2, Tx3) generate signals that are being received by three receivers (Rx1, Rx2, Rx3), each of the receivers is receiving the transmission from each of the transmitters reflected by objects in the environment. Each receiver can attempt to determine the range and Doppler of objects by correlating with delayed replicas of the signal from each of the transmitters. The physical receivers may then be "divided" into three separate virtual receivers, each virtual receiver correlating with delay replicas of one of the transmitted signals.

There are several different types of signals that transmitters in radar systems employ. A radar system may transmit a pulsed signal or a continuous signal. In a pulsed radar system, the signal is transmitted for a short time and then no signal is transmitted. This is repeated over and over. When the signal is not being transmitted, the receiver listens for echoes or reflections from objects in the environment. Often a single antenna is used for both the transmitter and receiver and the radar transmits on the antenna and then listens to the received signal on the same antenna. This process is then repeated. In a continuous wave radar system, the signal is continuously transmitted. There may be an antenna for transmitting and a separate antenna for receiving.

Another classification of radar systems is in the modulation of the signal being transmitted. A first type of continuous wave radar signal is known as a frequency modulated continuous wave (FMCW) radar signal. In an FMCW radar system, the transmitted signal is a continuous sinusoidal signal with a varying frequency. By measuring a time difference between when a certain frequency was transmitted and when the received signal contained that frequency, the range to an object can be determined. By measuring several different time differences between a transmitted signal and a received signal, velocity information can be obtained.

A second type of continuous wave signal used in radar systems is known as a phase modulated continuous wave (PMCW) radar signal. In a PMCW radar system, the transmitted signal from a single transmitter is a continuous sinusoidal signal in which the phase of the sinusoidal signal varies. Typically, the phase during a given time-period (called a chip period or chip duration) is one of a finite number of possible phases. A spreading code consisting of a sequence of chips, (e.g., +1, +1, −1, +1, −1 ... ) is mapped (e.g., +1→0 radians, −1→π radians, where +1 corresponds to a phase of 0 radians and −1 corresponds to a phase of n radians) into a sequence of phases (e.g., 0, 0, π, 0, π ... ) that is used to modulate a carrier signal to generate the radio frequency (RF) signal. The spreading code could be a periodic sequence or could be a pseudo-random sequence with a very large period, so it appears to be a nearly random sequence. The spreading code could be a binary code (e.g., +1 or −1). The resulting signal has a bandwidth that is proportional to the rate at which the phases change, called the chip rate $R_c$, which is the inverse of the chip duration $T_c = 1/R_c$. By comparing the return signal to the transmitted signal, the receiver can determine the range and the velocity of reflected objects.

In some radar systems, the signal (e.g., a PMCW signal) is transmitted over a short time-period (e.g., 1 microsecond) and then turned off for a similar time-period. The receiver is only turned on during the time-period where the transmitter is turned off. In this approach, reflections of the transmitted signal from very close targets will not be completely available because the receiver is not active during a large fraction of the time when the reflected signals are being received. This is called pulse mode.

The radar sensing system of the present invention may utilize aspects of the radar systems described in U.S. Pat. Nos. 10,261,179; 9,971,020; 9,954,955; 9,945,935; 9,869,762; 9,846,228; 9,806,914; 9,791,564; 9,791,551; 9,772,397; 9,753,121; 9,599,702; 9,575,160, and/or 9,689,967, and/or U.S. Publication Nos. 2018/0231656, 2018/0231652, 2018/0231636, and 2017/0309997, and/or U.S. provisional applications, Ser. No. 62/486,732, filed Apr. 18, 2017, Ser.

No. 62/528,789, filed Jul. 5, 2017, Ser. No. 62/573,880, filed Oct. 18, 2017, Ser. No. 62/598,563, filed Dec. 14, 2017, Ser. No. 62/623,092, filed Jan. 29, 2018, and/or Ser. No. 62/659, 204, filed Apr. 18, 2018, which are all hereby incorporated by reference herein in their entireties.

Digital frequency modulated continuous wave (FMCW) and phase modulated continuous wave (PMCW) are techniques in which a carrier signal is frequency or phase modulated, respectively, with digital codes using, for example, GMSK (Gaussian minimum shift keying). Digital FMCW radar lends itself to be constructed in a MIMO variant in which multiple transmitters transmitting multiple codes are received by multiple receivers that decode all codes. The advantage of the MIMO digital FMCW radar is that the angular resolution is that of a virtual antenna array having an equivalent number of elements equal to the product of the number of transmitters and the number of receivers. Digital FMCW MIMO radar techniques are described in U.S. Pat. Nos. 9,989,627; 9,945,935; 9,846, 228; and 9,791,551, which are all hereby incorporated by reference herein in their entireties.

Figure 4:
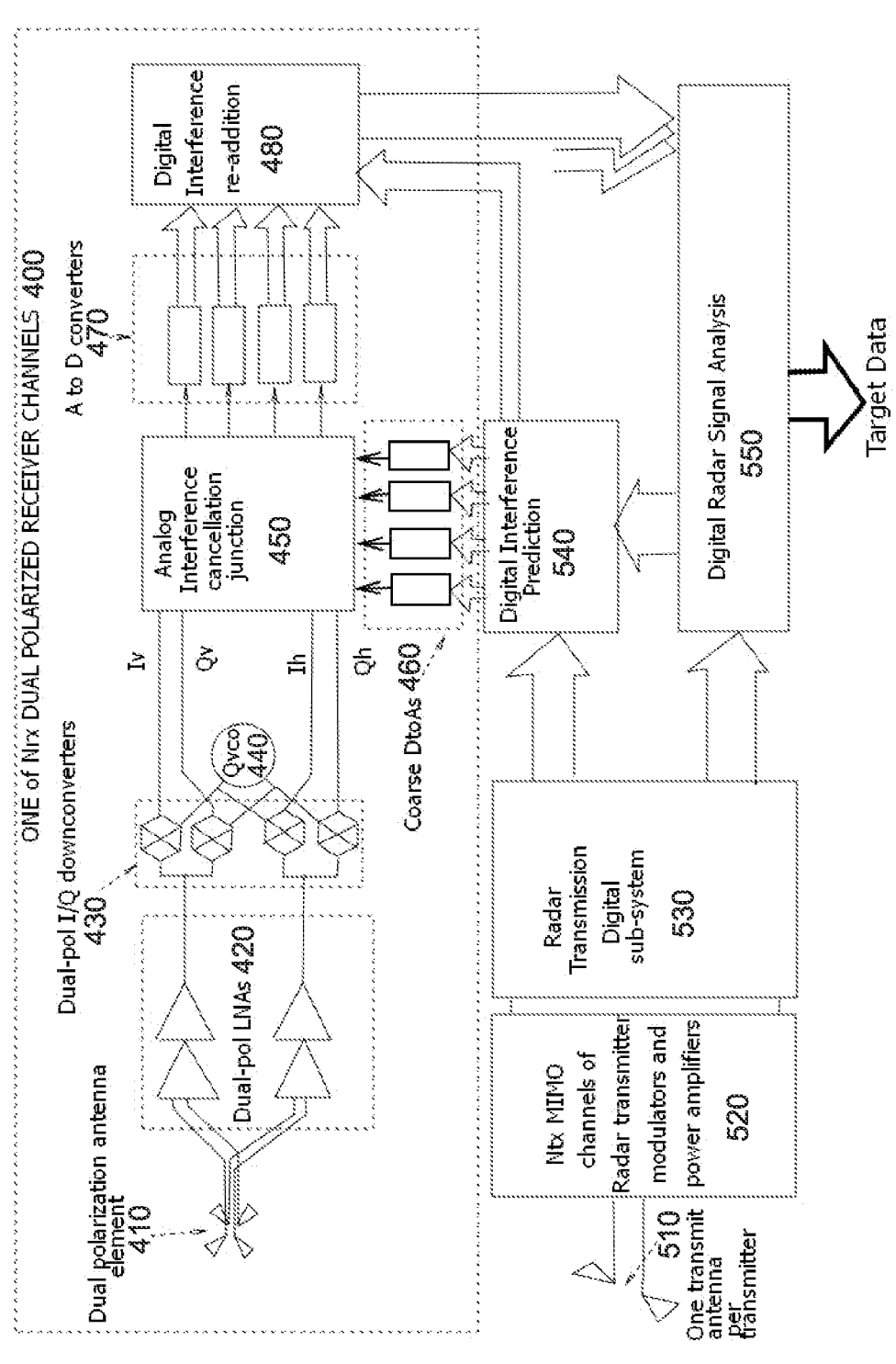
FIG. 4 is a block diagram of an exemplary dual-polarized MIMO radar system with dual polarization receive channels in accordance with the present invention.

Dual-Polarized Multiple-Input, Multiple-Output (MIMO) Radar:

FIG. 4 is a block diagram of an exemplary radar system that provides for greater immunity to interference from other radar systems, particularly chirp radars. The exemplary radar system comprises a plurality of transmission channels 520 coupled to associated antennas 510. A digital subsystem 530 receives the radar transmission, which is delivered to a digital interference prediction step 540 and a digital radar signal analysis domain 550. Dual-polarization low noise amplifiers (LNAs) 200 of an exemplary dual polarized receiver channel 400 receive respective horizontal and vertical polarization radio signals from associated dual polarization antenna elements 410. The vertical and horizontally polarized radio signals are downconverted into respective vertical I,Q and horizontal I,Q signals by dual-polarization I/Q downconverters 430 and a quad VCO 440, and input to an analog interference cancellation junction 450. The exemplary radar system also provides "good citizen" measures that help to reduce interference (from the radar system) that might be caused to other radar systems. The radar system will include exemplary dual polarization receive channels 400 in the expectation that interference will be a different polarization than the desired radio signals transmitted by own transmitters and reflected from targets in the environment. The radar system also provides an improved signal handling dynamic range to avoid the receive channels saturating at the A-to-D converter stage 470 before the radio signal has reached the digital signal processing domain 480, 550.

The exemplary radar system of FIG. 4 improves the dynamic range up to and including the analog-to-digital (A-to-D) converters 470 by using the results of digital radar signal analysis to date from the digital signal processing domain 550 in a digital signal prediction step 540 to construct a digital prediction of the receiver channel signals to be received at a future time (e.g., 1 μs into the future. The dynamic range may also be improved by digital-to-analog (D-to-A) converting the digital predictions into the analog domain using, for example, coarse digital-to-analog converters 460 and to then subtract the analog interference prediction signals from the corresponding receive channel signals in a summing or subtracting junction (e.g., the analog interference cancellation junction 450), such that the residual signals presented to the A-to-D converters 470 are of a reduced amplitude but still filling the dynamic range of the A-to-D converters 470. Thus, the total dynamic range for signal handling is equal to the dynamic range of the A-to-D converters 470 enhanced by the amount by which interference subtraction lowered the residuals. One way to think of it is that the coarse D-to-A converters 460 might slice off the top 4 bits of signal dynamic range leaving the bottom 6 bits only to be converted by A-to-D converters 470, and thereby achieving the equivalent of a 10-bit conversion.

To achieve the accuracy of, for example, a 10-bit conversion, the amount of interference subtracted in the analog domain has to be added back in the digital interference re-addition module 480 with high accuracy. The method envisaged to do this is that each level (perhaps 16 to 64 levels) of each of the coarse D-to-A converters 460 will have an auto-learned digital word to describe it, which will be adaptively learned to a high accuracy so that when that level is subtracted in the analog domain (in the analog interference cancellation junction module 450), an accurate digital value will be added back in the digital interference re-addition module 480.

It is assumed that, after the A-to-D converters 470 of limited word length, the digital signal processing thereafter (e.g., via the digital radar signal analysis module 550 and/or subsequent data processors) can have whatever word length is needed to avoid digital saturation.

Figure 5:
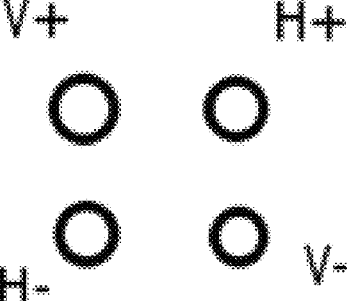

The analog interference subtraction (via the analog interference cancellation junction module 450) should occur as early as possible in the analog path. In one exemplary embodiment, the analog interference subtraction is performed after downconversion to the (I,Q) baseband (which was performed via the dual-polarization downconverters 430 and the quad VCO 440). It is seen that the subtraction is often complex and power consuming to convert the predictions to 80 GHz for subtraction in the RF domain; and moreover, causes significant noise factor degradation. To do that, measures must be taken to avoid local transmit-receive spillover, such as separating transmit and receive chips, separation between transmit and receive antennas arrays, and use of a balanced RF I/O. For dual-polarization receivers (e.g., containing dual polarized receiver channels 400), the balanced dual-polarization antenna (V,H) connection to the dual polarization antenna element 410 can comprise four ball-bonds in a square as shown in FIG. 5.

When arranged in the above way, the signals are nominally spatially orthogonal and any residual coupling between them can hardly be important given that the dual-polarization antenna is also crossed-dipoles for example.

With the availability of the dual-polarization signals from Nrx receivers and both polarizations, the digital radar signal analysis (550) can comprise, as previously seen, of an FFT-based scheme for pulse-by-pulse correlation of the received signal in each channel with the known transmitter codes. If this is done, note that transmitting with a GMS-K.UMSK modulation using the GSM 90-degree per bit pre-rotation coding reduces the correlation to correlating a complex received signal with a real template, rather than a full complex* complex correlation. There might however be even faster and less power consuming correlation methods that need no multiplies, which can be when the same received signal is to be correlated with many binary codes (many shifts of many different codes is a large number of binary correlations). These are based on the fact that the number of possible bit patterns of finite length, such as 8, is 256 times however many codes are used to correlate with, and since the same 256-bit patterns will reoccur many times in many codes, 8 signal samples need be combined only once in all 256 ways, and by doing it in Gray code order, only one new addition is required for each combination. (The latter alone is an 8:1 speed up).

There is an advantage in the per-pulse FFT correlation method. When the signal is temporarily available in the frequency domain, narrow-band interference stands out and can be clipped, nulled or otherwise mitigated.

An advance on interference nulling in the spectral domain only is to perform a rough beamforming over all antenna channels for each FFT component. A rough beamforming over, for example, 16 receive channels can be a 16-point FFT. Whatever is used, it should be an easily invertible, information lossless transform, but not necessarily an orthogonal transform like the FFT.

The combination of a 256-pt FFT for correlation with a 16-pt FFT over corresponding spectral components of the 256-pt FFT is in fact a 256×16 2-D FFT, which is a 2,048-pt Walsh-Fourier transform. The difference between a 2,048-pt Fourier transform and a Walsh-Fourier transform is that the former has twiddles at each stage while the latter omits twiddles between certain stages corresponding to the "Walsh" part. So, there are no twiddles between the 256-pt correlation FFT and the 16-pt beamforming FFT.

After a rough beamforming of each FFT component, the signal is in the 3D domain of spectrum and space. Nulling out large components at particular frequencies and in particular spatial directions removes less of the wanted signal energy. Moreover, the directions from which other-radar interference is received are likely to be long-term stable. Therefore, the directions in which to null-out spectral components of the interference can be determined over many pulses or even scans and do not change even if the interference spectrum changes.

Polarization can be added as yet another dimension in which to segregate interference. Since the polarization of other radar interference is also likely to be long-term stable, it can be determined solidly and then the following algorithm can be used to annul it to great advantage even though the polarization domain has only two points.

For example, for each spatio-spectral component to be cleaned up, the equation $\alpha V + \beta H$ is formed, where V and H are the horizontal and vertical components (or other cross-polarized components such as +/−45). The resulting polarization, which is determined by the ratio of $\alpha$ to $\beta$, is orthogonal to the interferer's polarization. However, but the scaling of $\alpha$ and $\beta$ is chosen to leave the signal component unattenuated. Unattenuated within reason—if the polarizations of the signal and interferer were close, $\alpha$ and $\beta$ would become large, magnifying noise. Thus, in at least that case, there is a compromise between noise magnification and signal loss that is known from many other similar problems.

So, using all 3 domains (i.e., spectral, spatial and polarization), substantial reduction of interference from other radars can already be obtained at the per-pulse stage. It is possible that only a single polarization, the above weighted combination of V and H, need be passed on to be accumulated over all pulses.

Inverting the rough beamforming needs to be done only once on the accumulated array just before the correlation IFFTs are performed.

The additional complexity introduced for spatio-spectral-polarization interference nulling is a doubling of the number of correlation FFTs to be performed, as there is one for each polarization. This is needed on the assumption that different interferers in different parts of the spectrum (or lying in different directions) might have different polarizations. Thus, even though their polarizations may be known in advance, if they are not the same, a polarization combination cannot be performed ahead of the FFT and rough beamforming FFT. Instead, the interferences need to be separated by spectrum and direction in order to apply a polarization nulling adapted to each one.

In addition, the exemplary embodiment illustrated in FIG. 4 includes the rough beamforming FFTs. This includes 256, 16-point beamforming FFTs after sixteen 16×16 point correlation FFTs (assuming 16 receivers, one FFT per RX (and per TX)). This is less than a 50% increase in processing, as the FFT has twiddles between its two stages of 16 pt FFTs, while no twiddles are needed between the FFTs and the beamforming.

Thus, the exemplary embodiments discussed herein include an exemplary radar system that provides for greater immunity to interference from other radar systems, particularly from chirp radars. The exemplary radar system also provides "good citizen" measures that help to reduce interference (by the radar system) that might be caused to other radar systems. The radar system includes exemplary dual polarization receive channels in the expectation that interference will be a different polarization than the desired radio signals transmitted by own transmitters and reflected from targets in the environment. The radar system also provides an improved signal handling dynamic range to avoid receive channels saturating at the A-to-D converter stage before the radio signal has reached the digital signal processing domain.

Changes and modifications in the specifically described embodiments can be carried out without departing from the principles of the present invention, which is intended to be limited only by the scope of the appended claims, as interpreted according to the principles of patent law including the doctrine of equivalents.

The invention claimed is:

1. A radar system comprising:
a transmit pipeline comprising a plurality of transmitters configured to transmit radio signals; and
a receive pipeline comprising a plurality of receivers configured to receive radio signals that include (i) first radio signals transmitted by the plurality of transmitters and reflected from objects in an environment, and (ii) other radio signals that include second radio signals transmitted by at least one external transmitter distinct from the plurality of transmitters, wherein the second radio signals are unknown to the receive pipeline;
wherein the receive pipeline comprises dual polarization receive channels configured to receive radio signals with corresponding polarizations, such that at least the first radio signals and the second radio signals are received with different respective polarizations;
a signal analysis module configured to predict anticipated receive channel radio signals to be received based upon previously received receive channel radio signals, wherein the anticipated receive channel radio signals are defined at least in part by the previously received second radio signals, wherein the signal analysis module is configured to generate an interference prediction signal defined at least in part by the second radio signals, and wherein the signal analysis module is configured to perform correlation transforms comprising a fast Fourier transform combined with a Walsh-Fourier transform on the received receive channel radio signals to predict the anticipated receive channel radio signals to be received, and wherein correlation transforms and beamforming transforms are performed for each polarization; and a summing junction configured to subtract the interference prediction signal from the received radio signals to reduce interference from the second radio signals transmitted by the at least one external transmitter;

wherein the receive pipeline is configured to provide interference immunity from the second radio signals transmitted by the at least one external transmitter, such that interference from the second radio signals transmitted by the least one external transmitter is mitigated based at least in part upon polarization differences and the interference prediction signal.

2. The radar system of claim 1, wherein the first radio signals have a first polarization, and wherein the second radio signals have a second polarization that is different from the first polarity.

3. The radar system of claim 2, wherein the dual polarization receive channels of the receive pipeline are configured to process the first radio signals separately from the second radio signals.

4. The radar system of claim 1, wherein the at least one external transmitter is a transmitter in a chirp radar.

5. The radar system of claim 1, wherein the at least one external transmitter is part of another radar system, and wherein the transmit pipeline is configured to avoid transmitting radio signals that interfere with the other radar system.

6. The radar system of claim 1, wherein the receive pipeline is configured to increase a signal handling dynamic range, wherein the increase in signal handling dynamic range is defined by the range necessary to avoid receive channels of the receive pipeline saturating at a respective first analog-to-digital (A-to-D) converter stage for each receive channel before the radio signal has reached the digital signal processing domain.

7. The radar system of claim 6 further comprising:

a coarse digital-to-analog (D-to-A) converter configured to D-to-A convert the predicted receive channel radio signals into analog predicted signals; and the summing junction configured to subtract the analog predicted signals from the received radio signals to produce residual signals, wherein the residual signals presented to the respective first A-to-D converter stages are of a reduced amplitude but still filling the dynamic range of the first A-to-D converter stages.

8. The radar system of claim 7 further comprising a re-addition module configured add a digital value to digital outputs of the first A-to-D converter stages, wherein the digital value is defined by the analog predicted signals which were subtracted by the summing junction.

9. The radar system of claim 7, wherein the summing junction is configured to receive downconverted radio signals, wherein the downconverted radio signals are downconverted to the (I,Q) baseband.

10. The radar system of claim 1, wherein the signal analysis module is configured to determine a spatial direction of at least a portion of the second radio signals, and wherein the interference prediction signal is defined at least in part by the determined spatial direction of at least a portion of the second radio signals.

11. A method for receiving radio signals and mitigating received interference signals, the method comprising:

transmitting, with a transmit pipeline that comprises at least one transmitter, radio signals;

receiving, with a receive pipeline that comprises at least one receiver, radio signals that include (i) first radio signals transmitted by the at least one transmitter and reflected from objects in an environment, and (ii) other radio signals that include second radio signals transmitted by at least one external transmitter distinct from the at least one transmitter, wherein the receiver is a dual polarization receive channel configured to receive radio signals with corresponding polarizations, and wherein the second radio signals are unknown to the receive pipeline;

predicting anticipated receive channel radio signals to be received based upon previously received receive channel radio signals, wherein the anticipated receive channel radio signals to be received are defined at least in part by the previously received second radio signals, and further comprising generating an interference prediction signal defined at least in part by the second radio signals, and wherein predicting anticipated receive channel radio signals to be received based upon previously received receive channel radio signals comprises performing correlation transforms comprising a fast Fourier transform combined with a Walsh-Fourier transform on the received receive channel radio signals to predict the anticipated receive channel radio signals to predict the anticipated receive channel radio signals to be received, and wherein the correlation transforms and beamforming transforms are performed for each polarization;

subtracting the interference prediction signal from the received radio signals to reduce interference from the second radio signals transmitted by the at least one external transmitter; and mitigating interference in the received radio signals by separately processing the first radio signals and the second radio signals, such that interference from the second radio signals transmitted by the at least one external transmitter is mitigated based at least in part upon polarization differences and the interference prediction signals.

12. The method of claim 11, wherein the first radio signals have a first polarization, and wherein the second radio signals have a second polarization that is different from the first polarity.

13. The method of claim 11, wherein separately processing the first and second radio signals comprises separately processing, with the dual polarization receiver, the first radio signals with the first polarization from the second radio signals with the second polarization.

14. The method of claim 11, wherein the at least one external transmitter is a transmitter of a chirp radar.

15. The method of claim 11 further comprising increasing a signal handling dynamic range of the received radio signal as defined by the range necessary to avoid saturating receive channels of the receive pipeline at a first digital (A-to-D) converter stage.

16. The method of claim 15 further comprising:

digital-to-analog converting the predicted receive channel radio signals into analog predicted signals; and subtracting the analog predicted signals from the received radio signals to produce residual signals, wherein the residual signals presented to the first A-to-D converter stage are of a reduced amplitude but still filling the dynamic range of the first A-to-D converter stage.

17. The method of claim 16 further comprising adding a digital value to digital outputs of the first A-to-D converter stage, wherein the digital value is defined by the analog predicted signals which were subtracted.

18. The method of claim 16, wherein the analog predicted signals are subtracted from the received radio signals which have been downconverted into the (I,Q) baseband.

\* \* \* \* \*